United States Patent
Finlayson et al.

(10) Patent No.: US 12,530,754 B2
(45) Date of Patent: Jan. 20, 2026

(54) COMPUTER-IMPLEMENTED METHOD AND SYSTEM FOR IMAGE CORRECTION FOR A BIOMARKER TEST

(71) Applicant: Vital Signs Solutions Ltd, Cambridge (GB)

(72) Inventors: Graham Finlayson, Norwich (GB); Miranda Nixon-Hill, Exeter (GB)

(73) Assignee: VITAL SIGNS SOLUTIONS LTD, Cambridge (GB)

( * ) Notice: Subject to any disclaimer, the term of this patent is extended or adjusted under 35 U.S.C. 154(b) by 665 days.

(21) Appl. No.: 17/852,543

(22) Filed: Jun. 29, 2022

(65) Prior Publication Data

US 2022/0414848 A1 Dec. 29, 2022

(30) Foreign Application Priority Data

Jun. 29, 2021 (EP) .................................. 21275090

(51) Int. Cl.
  *G06T 5/92* (2024.01)
  *G06T 7/00* (2017.01)
  *G06T 7/90* (2017.01)

(52) U.S. Cl.
  CPC .............. *G06T 5/92* (2024.01); *G06T 7/0012* (2013.01); *G06T 7/90* (2017.01);
  (Continued)

(58) Field of Classification Search
  CPC .......... G06T 5/92; G06T 7/0012; G06T 7/90; G06T 2207/10024; G06T 2207/20052;
  (Continued)

(56) References Cited

U.S. PATENT DOCUMENTS

| 8,879,813 B1* | 11/2014 | Solanki | G06T 7/0016 382/128 |
| 2013/0050543 A1* | 2/2013 | Higashitsutsumi | H04N 23/67 348/241 |

(Continued)

FOREIGN PATENT DOCUMENTS

EP  2237220 A2  10/2010

OTHER PUBLICATIONS

Graham D. Finlayson et al., "The Alternating Least Squares Technique for Nonuniform Intensity Color Correction", Color Research and Application, Apr. 2014, pp. 232-242.

(Continued)

*Primary Examiner* — Lewis G West
(74) *Attorney, Agent, or Firm* — Leason Ellis LLP

(57) ABSTRACT

Computer-implemented image correction for a biomarker test includes a biomarker test which has a calibration array and a biomarker site, wherein the calibration array comprises plural colored patches and the biomarker site is color-responsive to indicate a measurement of biomarkers present. The method comprises: storing a reference color value for each of the plural colored patches; receiving an image of the biomarker test; defining shading of pixels of the image as D, a combination of a plurality of basis functions; defining a color correction matrix, M having parameters that when solved correct color of the calibration array in the image to the corresponding stored values; solving D and M for pixels of the image excluding pixels of the biomarker site; using D and M to interpolate values for pixels of the biomarker site of the image to generate a color and shading corrected image of the biomarker site.

13 Claims, 5 Drawing Sheets

(52) U.S. Cl.
CPC ............... *G06T 2207/10024* (2013.01); *G06T 2207/20052* (2013.01); *G06T 2207/30004* (2013.01); *G06T 2207/30208* (2013.01)

(58) Field of Classification Search
CPC . G06T 2207/30004; G06T 2207/30208; G06T 5/94
See application file for complete search history.

(56) References Cited

U.S. PATENT DOCUMENTS

| | | | | |
|---|---|---|---|---|
| 2013/0208081 | A1* | 8/2013 | Xiong | G06T 7/85 348/E5.051 |
| 2013/0267032 | A1* | 10/2013 | Tsai | G06F 18/22 436/95 |
| 2013/0338014 | A1* | 12/2013 | McDonough | G01N 33/96 506/14 |
| 2015/0359458 | A1 | 12/2015 | Erickson et al. | |
| 2017/0111582 | A1* | 4/2017 | Hu | H04N 17/002 |
| 2020/0126227 | A1 | 4/2020 | Adiri et al. | |
| 2020/0219283 | A1* | 7/2020 | Nishikawa | G06F 3/017 |
| 2020/0319085 | A1* | 10/2020 | Pini | G02B 21/0004 |
| 2020/0319102 | A1* | 10/2020 | Thon | G01N 15/1433 |
| 2023/0181042 | A1* | 6/2023 | Fan | A61B 5/4842 424/78.06 |
| 2025/0052747 | A1* | 2/2025 | Gellibolian | G01N 33/54388 |

OTHER PUBLICATIONS

Matheus Esteves Ferreira et al., "Illumination compensation algorithm for colorimetric detection of microfluidic paper-based devices with a smartphone", Optical Diagnostics and Sensing XXI, vol. 11651, pp. 1165108-01 to 1165108-11, Mar. 2021.

Jeffrey C. Lagarias et al., "Convergence Properties of the Nelder-Mead Simplex Method in Low Dimensions", Society for Industrial and Applied Mathematics, Dec. 1998, pp. 112-147.

Graham Finalyson et al., "Color Homography: Theory and Applications", IEEE Transactions on Pattern Analysis and Machine Intelligence, Jan. 2019, pp. 20-33.

EP Search Report for corresponding EP Application No. 21275090.5, dated Jan. 7, 2022.

\* cited by examiner

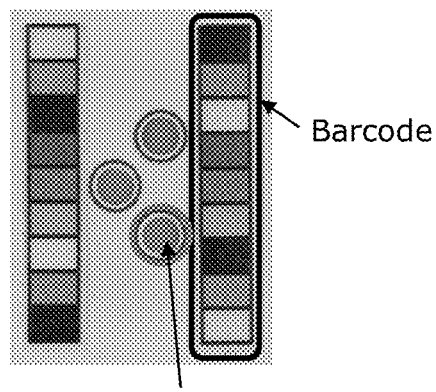
Fig. 2
Fig. 3
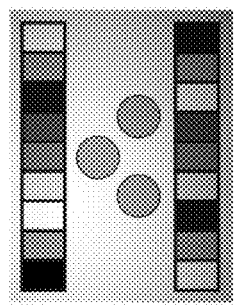
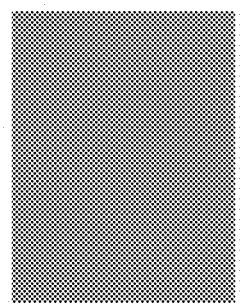 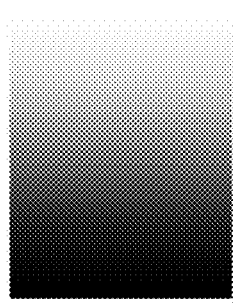 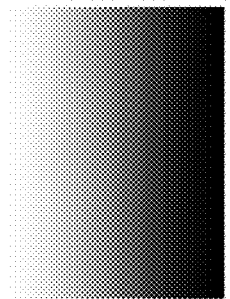
Fig. 4A       Fig. 4B       Fig. 4C

COMPUTER-IMPLEMENTED METHOD AND SYSTEM FOR IMAGE CORRECTION FOR A BIOMARKER TEST

CROSS REFERENCE TO RELATED APPLICATION

This application claims priority to European Patent Application No. 21275090.5 filed Jun. 29, 2021, the contents of which are incorporated by reference in its entirety as if set forth herein.

FIELD OF THE INVENTION

The present invention relates to a method and system for measuring biomarkers and in particular to a method and system for improving color accuracy of an image of a biomarker test site and a reference scale.

BACKGROUND TO THE INVENTION

A biomarker is typically a measurable indicator of the severity or presence of some disease or other physiological state of an organism.

An increasingly popular mechanism to measure biomarkers is to use a biomarker test (such as a test chip) onto which a sample is deposited, the chip being chemically reactive so that a measurement of the biomarker is visually discernible. In the simplest of cases this may be a binary presence/absence of an indicator that appears during the chemical reaction if test criteria are met. In more complex cases, a color scale is used to indicate a degree to which a biomarker is present in the sample.

While traditionally such biomarker tests were visually read and interpreted by a user or medical practitioner, more recently cameras such as those from smartphones have been used to capture an image of the indicator to enable recording and more accurate interpretation of the measurement by the smartphone or some remote computing system.

One example is a biomarker test to measure three key cardiovascular biomarkers—total cholesterol, HDL and triglycerides. Together, these biomarkers can provide insight into overall cardiovascular health. To carry out the test, a small blood sample is obtained via a finger prick, which is then placed on the test. The blood is separated by the test and directed to three different biomarker sites (it will be appreciated that more or less biomarker sites could be used). and a few minutes later a color change will have occurred at each of the biomarker sites. The color corresponds to a known color scale related to biomarker concentration. An image is then captured of the test, with the aim of quantifying the colors of the biomarker sites and thereby obtain estimates for the biomarker levels. These levels can then be immediately relayed to the user.

Statement of Invention

According to an aspect of the present invention, there is provided a computer-implemented method of image correction for a biomarker test, the biomarker test having a calibration array and a biomarker site, wherein the calibration array comprises a plurality of colored patches and the biomarker site is color-responsive to indicate a measurement of biomarkers present, the method comprising:
  storing, in a data repository, a reference color value for each of the plurality of colored patches;
  receiving an image of the biomarker test; defining shading of pixels of the image as D, a combination of a plurality of basis functions;
  defining a color correction matrix, M having parameters that when solved correct color of the calibration array in the image to the corresponding values stored in the data repository;
  solving D and M for pixels of the image excluding pixels of the biomarker site;
  using D and M to interpolate values for pixels of the biomarker site of the image to generate a color and shading corrected image of the biomarker site.

The plurality of basis functions may each comprise a slowly varying function and/or the plurality of basis functions may collectively comprise a slowly varying function (collectively such as when combined as by a weighted sum).

The method may further comprise extracting pixels of at least a subset of the calibration array from the image, the step of solving D and M being performed on the extracted pixels.

The plurality of basis shading functions may be 2D Legendre polynomials or 2D discrete cosine transform (DCT) functions or other slowly varying functions.

The plurality of basis shading functions are preferably chosen to model real world shading conditions.

The basis functions may be found using principal component analysis of the real world shading found in images of the biomarker test.

The basis functions may be found using characteristic vector analysis of the real world shading found in images of the biomarker test.

D and M may be iteratively solved using an alternating least-squares, ALS, procedure. D and M may be iteratively solved using a random sample consensus, RANSAC, procedure. D and M may be iteratively solved using a robust solving method. D and M may be solved using a simple search procedure such as the Nelder-Mead Simplex Method.

According to another aspect of the present invention, there is provided a biomarker test system comprising:
  a biomarker test having a calibration array and a biomarker site,
    wherein the calibration array comprises a plurality of colored patches and the biomarker site is color-responsive to indicate a measurement of biomarkers present;
  a data repository storing a reference color value for each of the plurality of colored patches;
  a computer system configured to execute computer program code to:
  receive an image of the biomarker test;
  define shading of pixels of the image as D, a combination of a plurality of basis functions;
  define a color correction matrix, M having parameters that when solved correct color of the calibration array in the image to the corresponding values stored in the data repository;
  solve D and M for pixels of the image excluding pixels of the biomarker site;
  use D and M to interpolate values for pixels of the biomarker site of the image to generate a color and shading corrected image of the biomarker site.

The computer system is preferably configured to identify the calibration array of the biomarker test in the received image and solve D and M for pixels of the calibration array.

While use of cameras and computer systems to process images of a biomarker test has seen increased interest, cameras face additional challenges that are to some extent compensated for by a human readers' visual system. One such issue is that the illumination of the test may vary from one test to another and also even across the surface of a test. Real-world images are always subject to shading. In some cases it may be minimal but this is not always the case. Shading across the image of a test, if ignored, will make both the color mapping of the biomarker sites to those of a predetermined reference less accurate (since the relative intensities of the patches will be incorrect in the image) and the final color values for the sites (since their intensities will also be modified). This may be something a human viewer may spot and compensate for but requires correction if skewing colors in a captured image. Additionally, models of cameras vary in terms of accuracy of color capture and this can also impact color mapping.

In embodiments of the present invention, a color reference is provided on the test itself (preferably in the form of barcodes or other scale). In order to obtain accurate colors, and therefore concentrations, embodiments seek to consider and correct the shading for both the color reference and the biomarker sites.

The biomarker sites themselves cannot be used because their color is not known. To address this:
   (i) shading is modelled as a plurality of basis functions and preferably as a slowly varying function (whether based on DCT bases [small numbers thereof] PCA, or other smoothly varying function)
   (ii) optimisation excludes the biomarker sites and the recovered results are used to interpolate the shading— because it is slowly varying—and colour calibration across the biomarker sites.

In preferred embodiments, a biomarker test design is utilized in which there is a significant gap between the reference calibration arrays (barcodes). This gap is specifically chosen to enable a shading correction to be determined of a completely unknown region, using only the reference patches.

Preferably, a shading field is determined for areas beyond the reference calibration array. This enables improvement of color accuracy for the biomarker sites.

Other putative definitions of shading could also be used, including a basis representation derived from images of real data.

An advantage of embodiments over other approaches is that there is no need for numerous additional patches specifically for shading correction. This keeps the valuable space on a compact test free for reference patches, and minimizes the number of high quality printed patches that are required (since variability in the print of these neutral patches would introduce error in the shading estimation).

One way of solving the coupled equations present in the method below is to use a robust solving method such as that described in G. D. Finlayson, H. Gong and R. B. Fisher, "Color Homography: Theory and Applications"*IEEE Transactions on Pattern Analysis and Machine Intelligence* 41 1 (2019), incorporated herein by reference. This covers the scenario where either the target is printed with variation in the color calibration and or the target is physically damaged (e.g. a greasy thumbprint). So long as >50% of the target colors are veridical embodiments implementing the method will still find the correct correction.

Another way of solving D and M is by a simple searching method such as that described in Lagarias, J. C., J. A. Reeds, M. H. Wright, and P. E. Wright. "Convergence Properties of the Nelder-Mead Simplex Method in Low Dimensions." SIAM Journal of Optimization. Vol. 9, Number 1, 1998, pp. 112-147, incorporated herein by reference.

BRIEF DESCRIPTION OF THE DRAWINGS

Embodiments of the present invention will now be described by way of example only with reference to the accompanying drawings in which:

FIG. 2 is an illustration of a biomarker test suitable for use with the biomarker measurement system of FIG. 1;

FIG. 3 is an example image of a biomarker test;

FIGS. 4A-4C are images of a discrete cosine transform basis functions;

DETAILED DESCRIPTION

Figure 1:
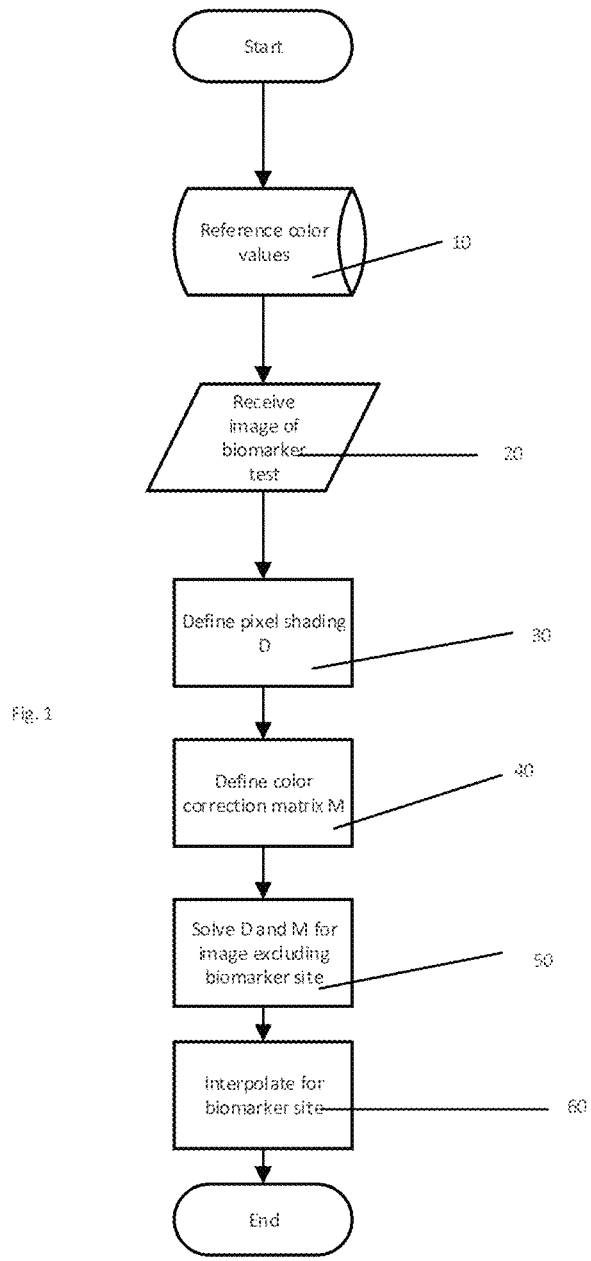
FIG. 1 is a flow diagram of a biomarker measurement system according to an embodiment.

FIG. 1 is a flow diagram of a biomarker measurement system according to an embodiment. FIG. 2 is an illustration of a biomarker test suitable for use with the biomarker measurement system of FIG. 1.

In one embodiment, a computer-implemented method of image correction for a biomarker test is executed.

The biomarker test has a calibration array and a biomarker site (test site), the calibration array comprising a plurality of colored patches. The biomarker site is color-responsive to indicate a measurement of biomarkers present. A per-image transform is produced, mapping biomarker site colors to a reference color space such that any dependence on the device and illumination is minimized.

The method includes:
   Storing in step 10, in a data repository, a reference color value for each of the plurality of colored patches;
   receiving in step 20 an image of the biomarker test;
   defining in step 30 shading of pixels of the image as D, a combination of a plurality of basis functions;
   defining in step 40 a color correction matrix, M having parameters that when solved correct color of the calibration array in the image to the corresponding values stored in the data repository;
   solving in step 50 D and M for pixels of the image excluding pixels of the biomarker site; and,
   using in step 60 D and M to interpolate values for biomarker site pixels of the image to generate a color and shading corrected image of the biomarker site.

It will be appreciated that there are different ways of excluding pixels of the biomarker site. In a preferred embodiment, pixels of the calibration array are detected or identified from the image (for example the test may have a known geometry that can be determined from the image or one that is identified from the data repository or other source). Where necessary, the image is rotated, scaled, de-skewed etc. D and M can then be solved for pixels of the calibration array, thereby avoiding the biomarker site. Similarly, where other sites are used, these can be likewise identified from the image itself or by reference to a known layout.

In a preferred embodiment, the test may have two calibration arrays that are positioned in a known orientation to each other on the test (in parallel, perpendicularly, etc.). Use of multiple arrays with known orientation advantageously aids in identifying the arrays and any image manipulation needed.

In preferred embodiments, a biomarker test design is utilized in which there is a significant gap between a pair of reference calibration arrays (barcodes). This gap is preferably chosen to enable a shading correction to be determined of a completely unknown region, using only the reference patches.

As an alternative to a pair of arrays, a test could, for example have test sites enclosed on all 4 sides or on two non-parallel sides by calibration arrays.

Preferably, each calibration array has at least 6 color patches of colors that preferably extend uniformly across the visible color spectrum. The surface of the test not occupied by calibration arrays could be as much as 90% of the area of the test.

Solving D and M may be on the basis of optimization/convergence criterion. For example, when alternating least squares, ALS, is used to solve for D and M the procedure converges and there is no criterion needed to decide when to stop. Practically, the method may be implemented so as to stop the computation of D and M when the change to fit of the data falls below a criterion amount. Other solving methods would have different convergence/best estimate criteria It will be appreciated that the storing in step 10 need only be done once and could be done ahead of time. The data repository may be local to or remote.

It will also be appreciated that the basis functions could also be defined ahead of time and encoded in the computer implemented method—if this approach is taken, the solution to D may vary from image to image but the basis functions themselves are the same for all images.

In the biomarker test of FIG. 2, the calibration array comprises two barcodes 110, 120 with different colored test patches that have been placed on the biomarker test 100 on either side of biomarker sites 131, 132, 133 such that an image of them (and the biomarker sites) will be captured when the biomarker test is photographed by the user during the measurement process.

It will also be appreciated that other layouts are also possible and that a single barcode, multiple barcodes or one or more other representations of the color reference could be used. When estimating shading using only a calibration array, there would preferably be a calibration array of some kind on at least two sides of the test sites (to enable shading to be inferred between them). However, it will be appreciated that there are embodiments described that can use additional information such as a white background—in such situations, a single calibration array could be used.

Consider the situation where we have an image of a biomarker test i(x,y), with dimensions m×n×3, i.e. i(x,y) returns the RGB triplet at pixel location (x,y). We can also represent this image as an N×3 matrix, I, where N is the total number of pixels (i.e. N=m×n). We represent the desired color correction matrix M as a 3×3 matrix, determined using knowledge of the expected colors of the barcode patches in a reference color space. Unless stated otherwise in the following discussion we will model an image as an N×3 matrix where the reader understands it is a simple matter to reinterpret this data as an m×n×3 image. Given a real image I—which is confounded by the unknown capture conditions—we would like to transform it to an output H for well controlled reference viewing conditions (e.g. a known colour of light and where the intensity of light is uniform across the target). Embodiments seek to correct the image I so that it is similar to the putative H.

Often, the color corrected image is calculated as H=IM, however in real life it is important to consider the impact of shading across the image. If the shading is ignored, both the mapping itself will be less accurate (since the relative intensities of the patches will be incorrect in the image) and the final color values for the sites will be inaccurate (since their intensities will also be modified, compounded by the affected mapping). Analogously to the image itself, the required 2D shading correction can be represented as a diagonal N×N matrix D (since each element in the diagonal matrix corresponds to a per-pixel multiplicative factor that modulates the magnitude of an RGB vector i.e. it models the effect of shading). In this case, H is related to I as:

$$H = DIM \quad (1)$$

For the reasons noted above, it is important to consider the shading for both the barcodes and the biomarker sites. This means that the above equation is even more challenging to solve, since although we wish to correct the colour of the biomarker sites (which account for x pixels in total), we cannot use any measurements therein to either calculate D or M. That is, we wish to estimate D and M using only the pixels in $I_\omega$ where w denotes a subset of the rows of I not in the biomarker sites. In the discussion that follows the number of pixels in w is equal to N'=N−x.

The existence of missing data means that we cannot estimate the shading (or color) directly, and so must make assumptions about the structure of D. In particular, we cannot directly solve for the shading for pixels outside of w. Thus, in embodiments, D is represented as the sum of k basis functions. Because we are representing shading as the sum of a small number of basis shading fields, we are able to estimate the shading of the biomarker site pixels by fitting the basis to the non-biomarker site regions.

The following considers in more detail one way of how we might represent the shading basis diagonal matrices. There are a number of possible options for these basis functions, for example 2D Legendre polynomials or 2D discrete cosine transform functions. A third option is to directly model the shading fields across reference white biomarker tests (i.e. the biomarker tests without the barcodes or the biomarker sites). To do this we simply take lots of pictures of the white biomarker tests under lots of typical viewing conditions. Then, principal component analysis can then be used to select a set of basis functions based on the shading fields found in the real world. Henceforth, we represent shading as a linear combination of a basis of shading adjustments as:

$$D = \sum_{i=1}^{k} c_i B_i \quad (2)$$

where $B_i$ are the N×N basis functions (represented as diagonal matrices), and $c_i$ are weighting coefficients. As a point of practical detail, we note that, while D and $B_i$ are diagonal matrices, we can ignore the off-diagonal terms when fitting the data. By using this formulation, the number of parameters to determine for the shading is hugely reduced from N (including x missing pixels) to k (the number of shading basis functions). Typically k is a very small fraction of the number of pixels and may in fact be fixed to 3, 4 or 5.

Having found a representation for D, the problem still remains of how to solve Equation 1. Let us start by assuming that we already know M. In this case, we can apply it to obtain a color corrected image, IM, and use a least squares approach to find D. That is, we want to find the shading that minimizes $\|DI_\omega M - H_\omega\|^2$ where D has the form described in Equation 2 and we solve for D using only a subset of the available pixels. Once we have estimated D we can hold it fixed and solving for M is a simple least-squares regression. We then hold M fixed to solve for the shading again and iterate in this way until the process converges.

In detail, in one embodiment we obtain D given M:
1. Prepare a 3p-row and k-column matrix, $R^p$, based on the basis functions multiplied by the color corrected image, where p is the number of colored barcode patches
    Find the product of the color corrected image with each of the basis functions: $B_{1,\omega} I_\omega M$, $B_{2,\omega} I_\omega M$, $B_{k,\omega} I_\omega M$, and then find the average over each known colored patch to move from an N'×3 matrix to a p×3 matrix
    Reshape each of these p×3 matrices into a 3p×1 column by stacking the RGB channels: $[[B_i(IM)_{red}]^p \ldots [B_i(IM)_{green}]^p \ldots [B_i(IM)_{blue}]^p]'$. Place the k columns next to each other to form the 3p×k matrix, $R^p$.
2. Prepare the known XYZ values [1-2] for the barcode patches into a p×3 matrix $H^p$ with a single XYZ value for each barcode patch, then stack the XYZ values as above to form a 3p×1 column vector $h^p$.
3. Find the weighting coefficients by carrying out a standard least squares regression:

$$\underline{c} = [R^p]^+ h^p$$

where the + represents the Moore-Penrose pseudo-inverse, $[R^p]^+ = [[R^p]^T [R^p]]^{-1} [R^p]^T$
4. Finally, construct D using the coefficients and basis functions according to Equation 2.

If we instead assume that we already know the shading field D, we can find the shading corrected image DI. Again, taking an average over the known barcode patches, a p×3 matrix of RGB values, $Q^p$ is formed. Using a least squares regression, M is determined:

$$M = (Q^p)^+ H^p$$

In reality, neither D nor M is known independently of the other. So we have to iterate—solve for D then M then D again and so on—until convergence. If we do this then an estimation procedure can be used called 'Alternating Least-squares (ALS)' (see, for example, G. D. Finlayson, M. Mohammadzadeh Darrodi and M. Mackiewicz "The alternating least squares technique for nonuniform intensity color correction" *Color Research and Application* 40 3 (2015) which is incorporated herein by reference). There are various other bilinear optimisations (of which the ALS formulation is one) including ransac (see G. D. Finlayson, H. Gong and R. B. Fisher, "Color Homography: Theory and Applications" *IEEE Transactions on Pattern Analysis and Machine Intelligence* 41 1 (2019) which is incorporated herein by reference). Importantly, even although D and M are iteratively computed only for the p patch colours these matrices are then applied across the entire image. That is, the vector c calculated in Step 3 above is used to compute the per pixel shading correction (substituted into Equation 2 above).

A key advantage of the approach set forth above is that it is entirely agnostic about the size of the test samples. One might envisage a manufacturer changing the size of the biomarker test patches but this change would not change the colour calibration already deployed. This said, for a fixed test patch design the above method can also treat the pixels in the background (not in the biomarker sites and not the colour patches) as additional information useful in determining the colour calibration.

Worked Example 1

Figure 5:
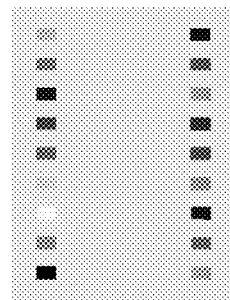
FIG. 5 is an image showing only calibration array reference patches extracted from the image of FIG. 3.
Figure 6:
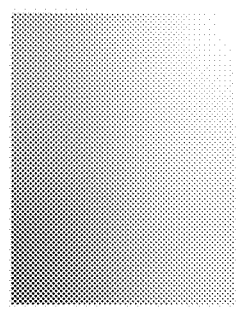
FIG. 6 is an image showing a shading correction field calculated from the references of FIG. 5, covering the whole image including the biomarker sites.
Figure 7:
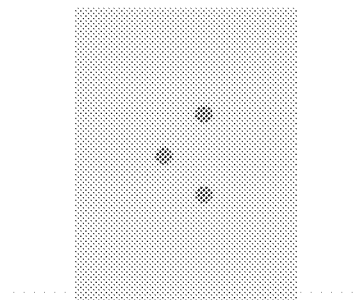
FIG. 7 shows the biomarker sites in the image of FIG. 5 after correction by the shading correction field and color correction performed by an embodiment.

1. Start with an input image (FIG. 3) with unknown shading across it. In this example, the three biomarker test sites (circles in center of image) are meant to have the same color however this is not always the case. If a mapping were generated using the barcode reference patches without considering shading, the resulting site color values would be both different from one another and inaccurate overall.
2. As an example, use the first three discrete cosine transformation (DCT) basis functions to model the shading (FIG. 4A-4C).
3. Select only the barcode reference patches—those parts of the image for which there are known XYZ values available, the ω subset above—and utilize, for example, an Alternating Least Squares (ALS) approach, to determine both a mapping and shading correction based on these regions alone (FIG. 5).
4. Obtain a final mapping M, and a shading correction field D (result pictured here for the example input image shown in step 1). Note that the shading correction field, despite being determined from the isolated barcode patches shown in step 3, covers the whole image including the biomarker sites (FIG. 6).
5. Apply mapping and shading correction to the sites, obtaining results which are more shading and color corrected and thus more accurate. As a final step the corrected site values are converted to biomarker concentration levels and presented to the user (FIG. 7).

Worked Example 2

In the above example, biomarker sites take up a relatively small proportion of the space between barcode pairs: barcodes take up ~40% of the image and the biomarker sites just ~7%. One could consider using the blank space between sites to aid shading correction. In this example the biomarker sites are significantly enlarged to take up ~27% of the image—as above the barcodes alone are used to determine the mapping and shading correction and so the method still works despite the fourfold increase in biomarker site size. This highlights the flexibility of the approach to work with different test designs and using very little real estate for calibration.

Figure 8:
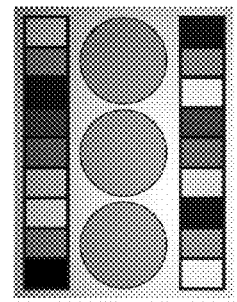
FIG. 8 is another example image of a biomarker test.
Figure 9:
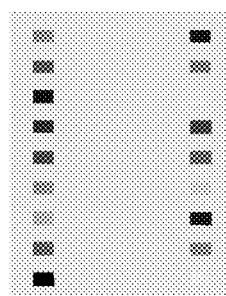
FIG. 9 is an image after calibration array reference patches are extracted from the image of FIG. 8.
Figure 10:
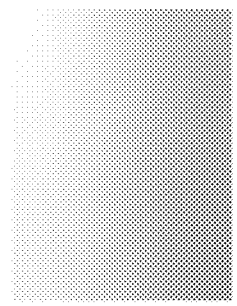
FIG. 10 is an image showing a calculated mapping and shading correction for the image of FIG. 8.
Figure 11:
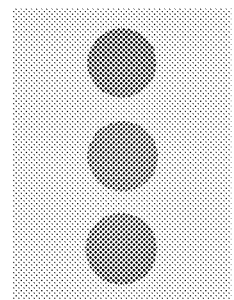
FIG. 11 is an image showing the biomarker sites in the image of FIG. 8 after correction by the shading correction field and color correction performed by an embodiment.

1. A modified version of the biomarker test design is used, with enlarged biomarker sites. Again, there is shading present across the image meaning that biomarker sites which should in this example have the same color do not (FIG. 8).
2. For consistency with the previous example, the first 3 DCT basis functions are used to model the shading.
3. Barcodes are extracted from the image, affected by the shading (FIG. 9).
4. The mapping and shading correction, shown in FIG. 10, are determined. Despite being developed using only the barcodes, the shading correction again includes the whole test region 5. After shading correction, the sites have more similar colors resulting in more accurate biomarker predictions (FIG. 11).

The invention claimed is:

1. A computer-implemented method of image correction for a biomarker test, the biomarker test having a calibration array and a biomarker site, wherein the calibration array comprises a plurality of colored patches and the biomarker site is color-responsive to indicate a measurement of biomarkers present, the method comprising:
   storing in a data repository, a reference color value for each of the plurality of colored patches;
   receiving an image of the biomarker test;
   defining shading of pixels of the image as D, a combination of a plurality of basis functions;
   defining a color correction matrix, M having parameters that when solved correct color of the calibration array in the image to the corresponding values stored in the data repository;
   solving D and M for pixels of the image excluding pixels of the biomarker site, wherein the step of solving D comprises solving D for pixels of the calibration array and in areas in a background area of the biomarker test that is not the biomarker site or the calibration array;
   using (60) D and M to interpolate values for pixels biomarker site of the image to generate a color and shading corrected image of the biomarker site.

2. The method of claim 1, further comprising extracting pixels of at least a subset of the calibration array from the image, the step of solving D and M being performed on the extracted pixels.

3. The method of claim 1, wherein the plurality of basis shading functions compromise 2D Legendre polynomials or 2D discrete cosine transform (DCT) functions.

4. The method of claim 1, further comprising receiving a plurality of images of the biomarker test under multiple typical viewing conditions, and selecting the plurality of basis shading functions to model the real world shading conditions.

5. The method of claim 4 wherein the basis functions are found using principal component analysis of the real world shading found in images of the biomarker test.

6. The method of claim 4, wherein the basis functions are found using characteristic vector analysis of the real world shading found in images of the biomarker test.

7. The method of claim 1, wherein D and M are iteratively solved using an alternating least-squares, ALS, procedure.

8. The method of claim 1, wherein D and M are iteratively solved using a random sample consensus, RANSAC, procedure.

9. The method of claim 1, wherein D and M are iteratively solved using a robust solving method.

10. The method of claim 1, wherein D and M are solved using a simple search procedure.

11. The method of claim 10, wherein the simple search procedure comprises the Nelder-Mead Simplex Method.

12. A biomarker test system comprising:
   a biomarker test having a calibration array and a biomarker site, wherein the calibration array comprises a plurality of colored patches and the biomarker site is color-responsive to indicate a measurement of biomarkers present;
   a data repository storing a reference color value for each of the plurality of colored patches;
   a computer system configured to execute computer program code to:
   receive an image of the biomarker test;
   define shading of pixels of the image as D, a combination of a plurality of basis functions;
   define a color correction matrix, M having parameters that when solved correct color of the calibration array in the image to the corresponding values stored in the data repository;
   solve D and M for pixels of the image excluding pixels of the biomarker site, wherein the solving D comprises solving D for pixels of the calibration array and in areas in a background area of the biomarker test that is not the biomarker site or the calibration array;
   use D and M to interpolate values for pixels biomarker site of the image to generate a color and shading corrected image of the biomarker site.

13. The biomarker test system of claim 12, wherein the computer system is configured to identify the calibration array of the biomarker test in the received image and solve D and M for pixels of the calibration array.

* * * * *